March 18, 1941.　　　A. J. JONES　　　2,235,154
METHOD FOR THE REDUCTION OF METALLIC OXIDES
Filed Feb. 28, 1939　　　4 Sheets-Sheet 1

INVENTOR
Arthur J. Jones

March 18, 1941.  A. J. JONES  2,235,154
METHOD FOR THE REDUCTION OF METALLIC OXIDES
Filed Feb. 28, 1939  4 Sheets-Sheet 2
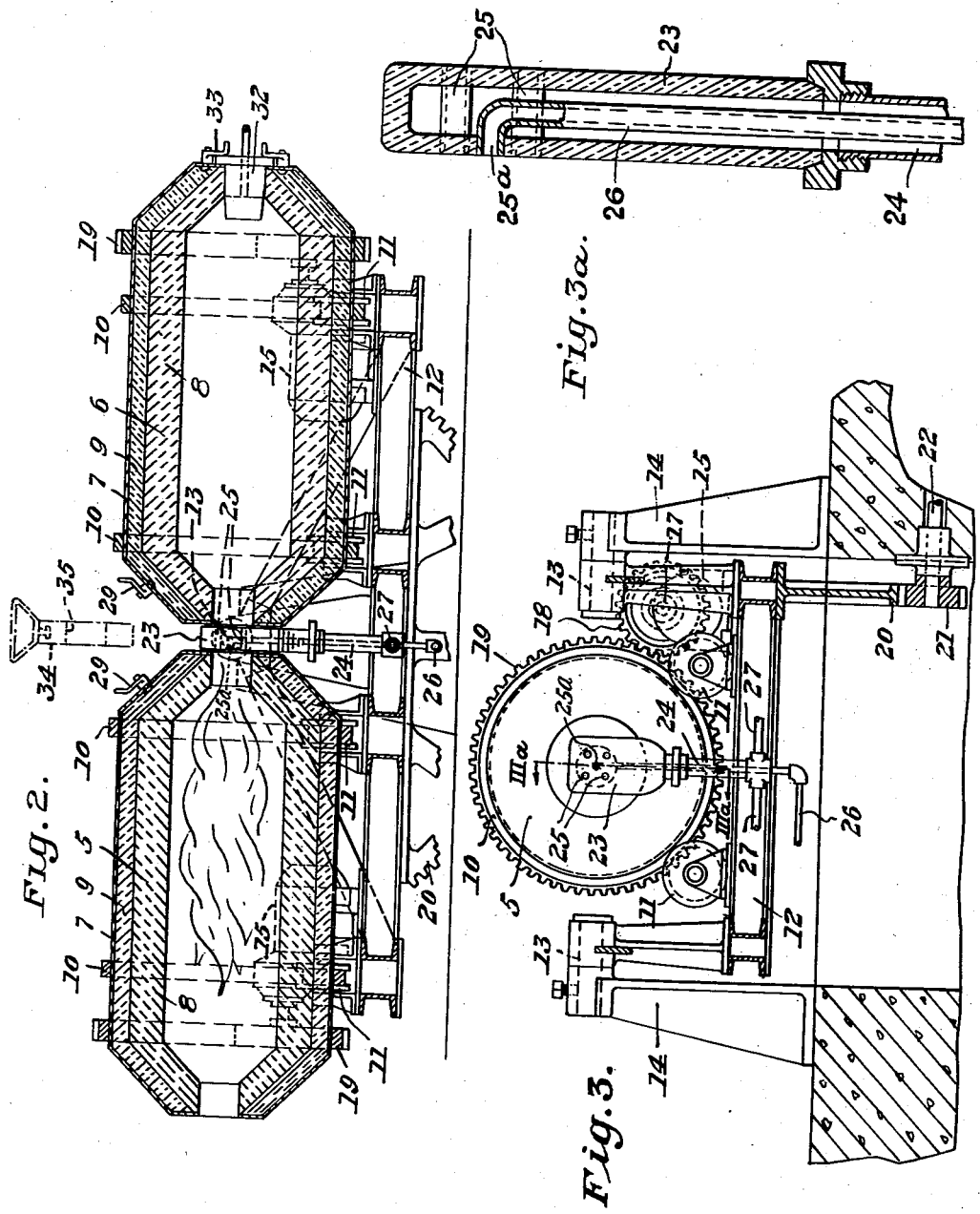
INVENTOR
Arthur J. Jones
by his attys.
Stebbins, Blenko + Parmelee

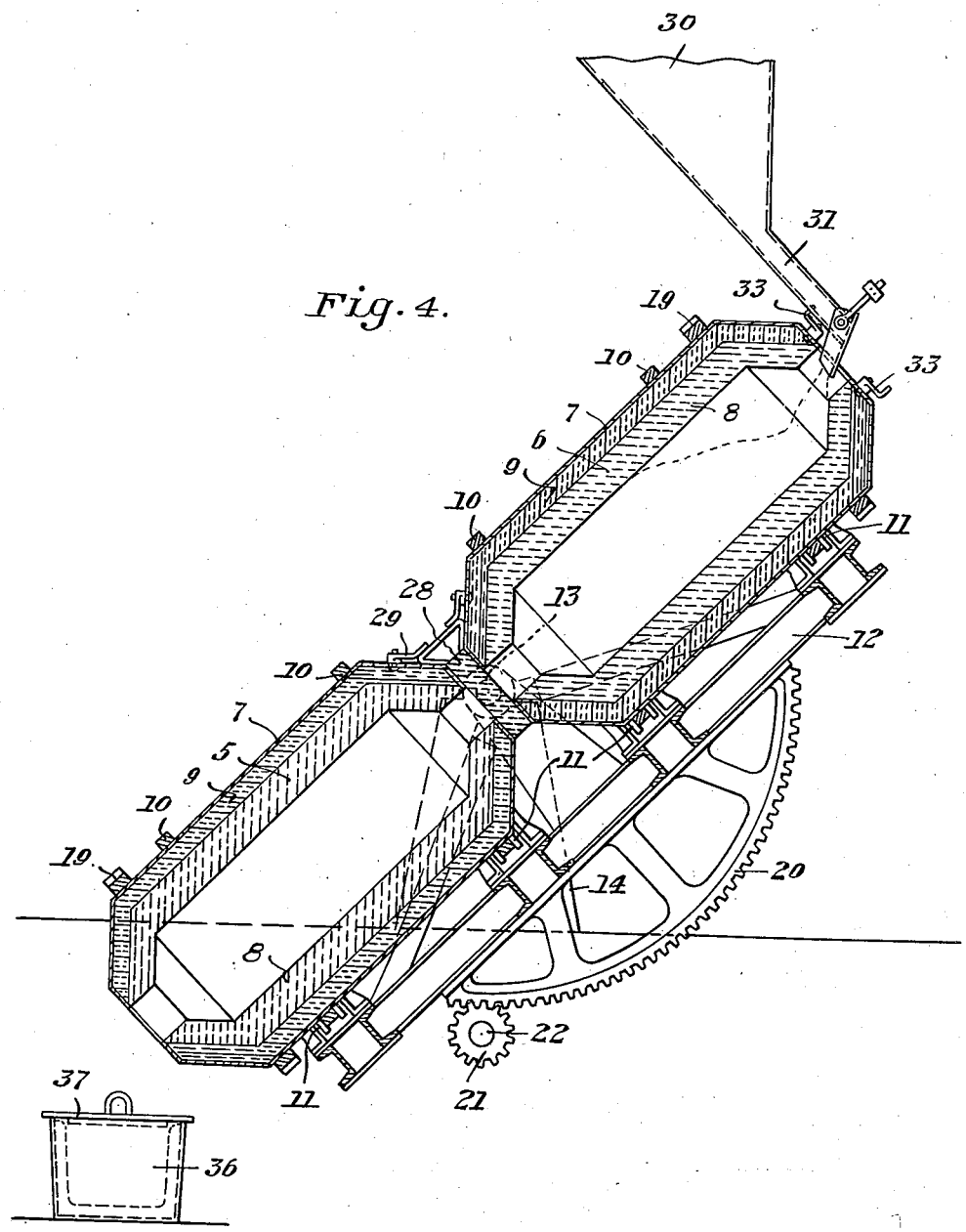

March 18, 1941.  A. J. JONES  2,235,154
METHOD FOR THE REDUCTION OF METALLIC OXIDES
Filed Feb. 28, 1939  4 Sheets-Sheet 4
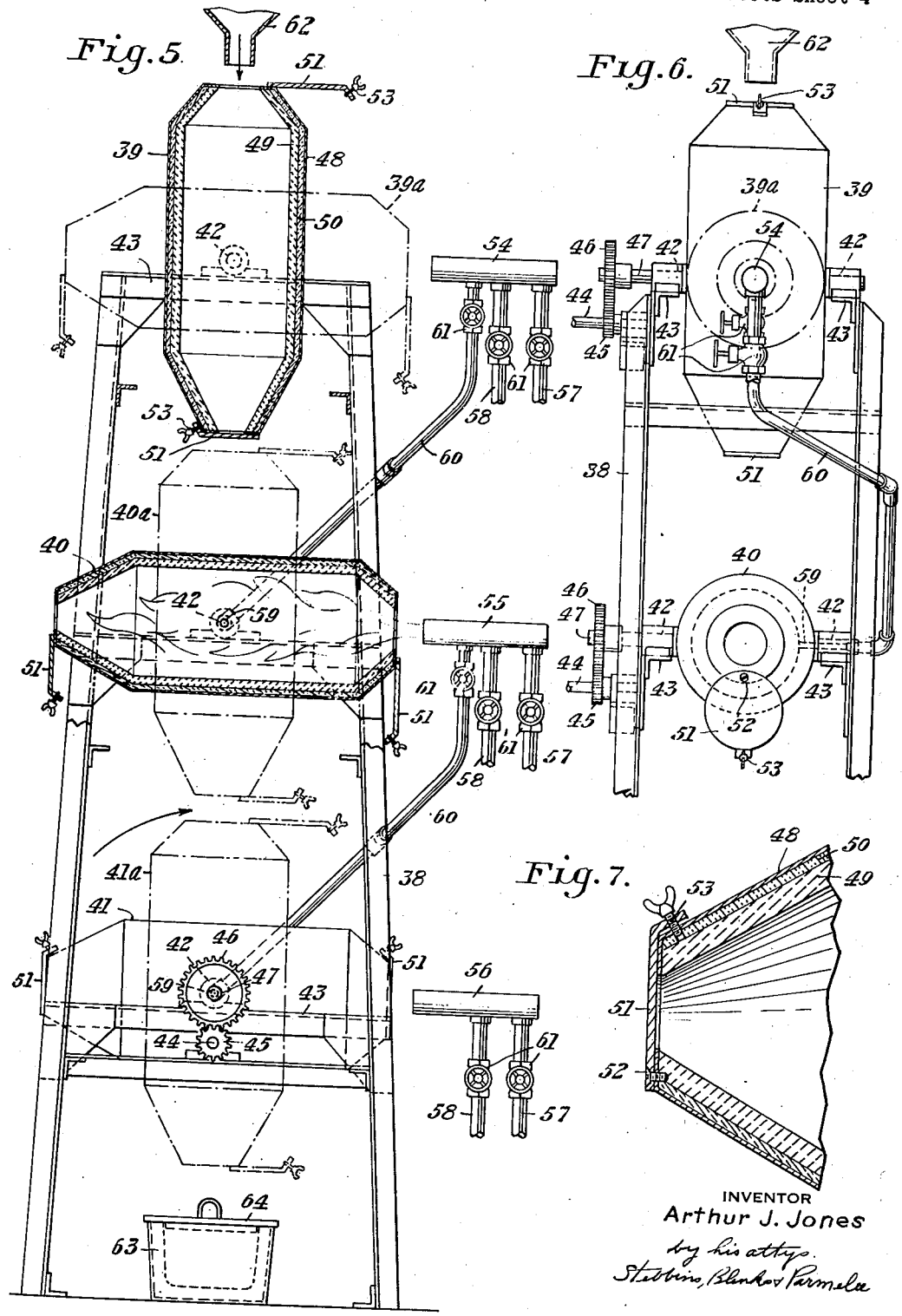
INVENTOR
Arthur J. Jones Patented Mar. 18, 1941

2,235,154

UNITED STATES PATENT OFFICE 2,235,154

METHOD FOR THE REDUCTION OF METALLIC OXIDES

Arthur J. Jones, Iron Mountain, Mich.

Application February 28, 1939, Serial No. 258,917

7 Claims. (Cl. 75—89)

This invention relates to a method for the reduction of metallic oxides, and more particularly to the reduction of metallic oxides naturally appearing in ores having a low concentration of the oxide. My invention is particularly useful in the reduction of metallic iron from low grade iron ore.

In the reduction of iron oxide by solid carbon it is believed that the following chemical reactions take place:

1. $C + CO_2 = 2CO$
2. $Fe_3O_4 + 4CO = Fe + 4CO_2$

Reaction (2) is exothermic, but reaction (1) is endothermic and requires so much heat that the entire reduction process is endothermic. If a mixture of iron ore and carbonaceous material is heated by direct contact with a flame, free oxygen, necessary for combustion, readily oxidizes a substantial portion of the hot metallic iron. A rapid and efficient reduction of the oxide is thereby prevented.

I have invented a method and apparatus in which the ore and carbonaceous material are heated without exposure to oxygen and in which the reduction may proceed in a reducing atmosphere. In accordance with my invention, chambers having refractory linings are first heated to the correct temperature, the source of heat is withdrawn and the chamber is charged with a mixture of carbonaceous material and the ore to be reduced. The heat necessary to carry out the reaction is retained by the refractory lining of the chamber and is transferred to the oxide and carbonaceous material when they are charged into the chamber and come in contact with the refractory lining.

Although my invention is particularly useful for the reduction of iron oxide in low grade ores, it may be used to reduce other metallic oxides. However, it should be noted that my invention lies in the field of what is known as "dry metallurgy"; that is, during the reduction process the oxide and any impurities with which it may be associated are not liquefied. There are some metallic oxides which cannot be reduced at temperatures below that at which the impurities or "gangue," with which they are associated, are liquefied. Therefore, it is to be understood that whenever reference is made in this application to a metallic oxide, I am referring to those metallic oxides which may be reduced at temperatures lower than that at which the gangue, with which they may be associated, are liquefied. A few of such oxides are iron oxide, copper oxide and manganese oxide.

In the accompanying drawings I have illustrated a present preferred embodiment of my invention, in which, Figure 1 is a plan view of apparatus in which a metallic oxide may be reduced;

Figure 2 is a vertical section of the apparatus along the lines II—II of Figure 1;

Figure 3 is a vertical section along the lines III—III of Figure 1;

Figure 3a is a vertical section along the line IIIa—IIIa in Figure 3;

Figure 4 is a vertical section of the apparatus when it is in a charging and discharging position;

Figure 5 is an elevation view partially in vertical section of another apparatus in which a metallic oxide may be reduced in accordance with my invention;

Figure 6 is a broken side elevation of the apparatus shown in Figure 5; and

Figure 7 is a broken longitudinal section of one end of a heating chamber to be used in the apparatus shown in Figure 5.

Figure 1:
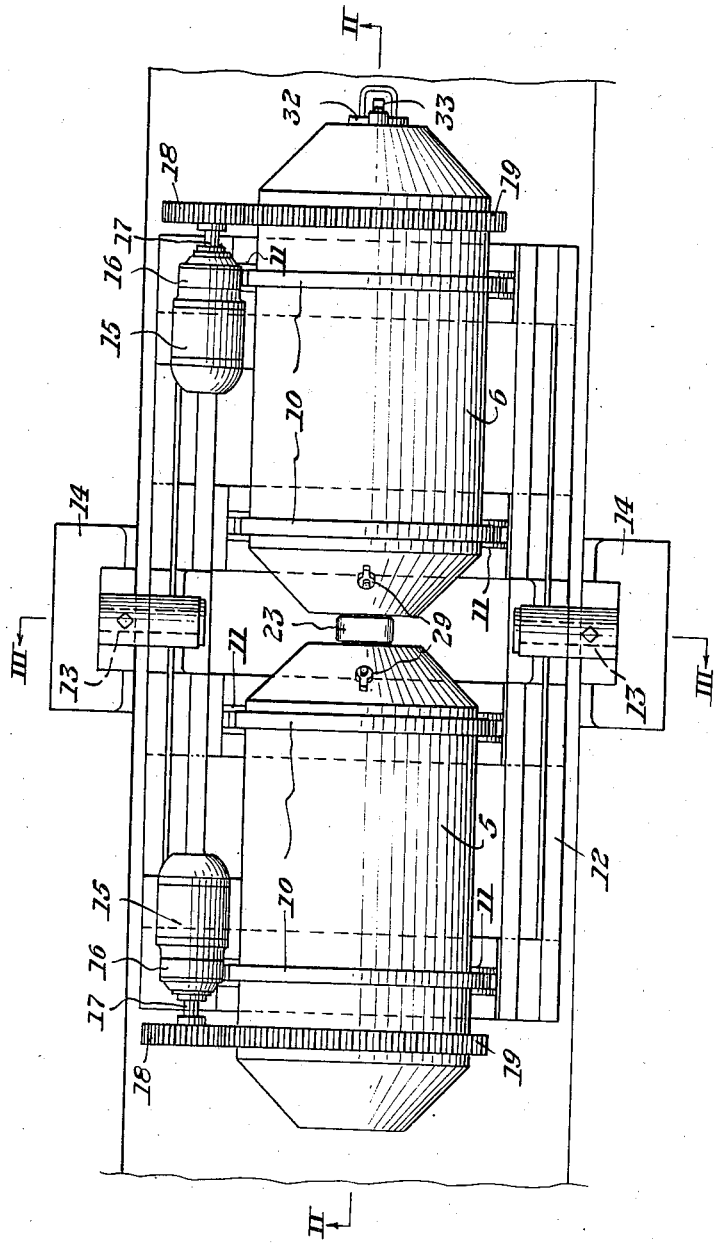

The reduction of the ore takes place in two cylindrical kilns 5 and 6 placed end to end and having openings at their ends. The kilns each have a sheet iron shell 7 with a lining 8 of suitable refractory material, and thus form two heating chambers in which the ore may be heated. A lining 9 of heat insulating material is interposed between the shell 7 and the refractory lining 8.

To bring as much of the ore as possible into contact with the refractory lining 8, the apparatus is arranged so that the kilns may rotate about their central longitudinal axis. For this purpose tracks 10 are secured around the circumference of the kilns 5 and 6 and run in rollers 11 which are carried by a frame 12. The frame 12 is hung from trunnions 13 mounted on standards 14 so that the entire assembly of the kilns and the frame may be rotated about an axis transverse to the central axis of the kilns.

The kilns are rotated along their longitudinal axis by motors 15 mounted on the frame 12. The motors 15 have built-in speed reducers 16 which carry shafts 17. Pinions 18 mounted on the shafts 17 engage ring gears 19 which are around the peripheries of the kilns.

A sector 20 is secured along one side of the bottom of the frame 12 to rotate the frame 12 about the trunnions 13. The sector 20 meshes with a pinion 21 which is driven by a suitable source of power through the shaft 22.

The refractory lined chambers formed by the kilns 5 and 6 are heated by means of a burner 23 which is maintained in position between the two kilns by a pipe 24, and which is shown in an enlarged scale in Figure 3a. A gas port 25a of the burner is so arranged that the chambers formed by the kilns 5 and 6 may be heated alternately in a manner which will hereinafter be described. Other ports 25 extend through the burner so that any combustible gases which are generated by the reduction reactions in the chamber which is not being heated may be utilized to heat the chamber which is being heated. A fuel gas supply pipe 26 and water pipes 27 for cooling the burner 23 pass through the pipe 24.

My method of reducing metallic oxides is as follows:

The refractory lined chamber of an empty kiln is heated until it reaches a temperature approximating but definitely below that at which the impurities or gangue associated with the metallic oxide are liquefied. The burner 23 is removed and a solid plug 28 is inserted in its place, being held in position by swing bolts 29. The kilns are then tilted about the trunnions 13 and a mixture of ore and carbonaceous material, preferably charcoal, is charged into the heated chamber as shown in Figure 4. The metallic oxide and carbonaceous material may be stored in a bin 30 and charged into the chamber by means of a chute 31. The kilns are then returned to a horizontal position and rotated on the rollers 11. The refractory lining 8 of the chamber in which the mixture of metallic oxide and carbonaceous material has been charged now heats the mixture and causes the reducing action to begin.

The burner 23 is replaced in position between the two kilns and while the mixture is being heated the other refractory lined chamber is heated by gas burned in the burner 23. During the time the mixture is being heated, the open end of the kiln into which the mixture was charged is closed by a plug 32 which is held in position by swing bolts 33. The plug prevents air from entering the chamber in which the reducing reaction is being carried on and forces any combustible gases which are generated during the reducing reaction to pass through the ports 25 in the burner 23 and thus enrich the heating flame.

As soon as the effective heat retained by the refractory lining in the chamber containing the charge has been transferred to the charge the burner 23 is replaced by a plug 34 having a passageway 35, the plug being held in place by swing bolts 29. The open end of the second kiln is closed by a plug similar to the plug 32 and the kilns are again tilted so that the charge passes into the second chamber which now has been heated to the correct temperature and further reduction takes place.

The charge is thus transferred between the two chambers until the oxide has been completely reduced. In tests which I have conducted with a furnace built in accordance with my invention I have found that the reduction may be accomplished in approximately one and one-quarter hours during which time the charge is transferred from one chamber to the other every fifteen minutes.

When the reduction of the oxide has been completed, the kilns are again tilted and the reduced metal and gangue may be discharged into a refractory lined receptacle 36. The receptacle 36 is closed by a cover 37 after receiving the reduced metal because the hot reduced metal is readily oxidized by exposure to air. After the reduced metal and gangue are cooled they are crushed and separated by any suitable method of separation. Thus, if iron oxide is the oxide being reduced, the charge after being cooled is crushed and passed under a magnetic separator.

As shown in Figure 4 the cycle of operations may be so arranged that one chamber is being filled with a fresh charge at the same time that reduced oxide is being discharged into the receptacle 36.

Figure 5 illustrates another form of furnace in which my process for reducing metallic oxides may be carried out. In accordance with this modification a series of refractory lined chambers are vertically positioned one above the other. Each chamber may be rotated about a transverse axis and each chamber is separately heated. While any number of chambers may be arranged in this manner, for convenience of illustration and description I have shown in Figure 5 only three such chambers.

A tower 38 supports three chambers 39, 40 and 41. The chambers rotate about trunnions 42 which are mounted on cross bars 43. Shafts 44 connected to a suitable source of power rotate pinions 45 which mesh with spur gears 46 keyed to shafts 47 on which the chambers are rotatably supported. Thus upon rotation of the shafts 44, the chambers will rotate about a transverse axis.

Each of the chambers 39, 40 and 41 has a sheet iron shell 48 with a lining 49 of suitable refractory material. A lining 50 of heat insulating material is transposed between the shell 48 and refractory lining 49. The chambers have openings at each end, which openings are closed by circular covers 51 pivotally mounted on the ends of the chambers by screws 52 and held in a closed position by wing bolts 53 which thread into the ends of the chambers.

The chambers 39, 40 and 41 are heated by gas burners 54, 55 and 56. The burners are supplied with gas by gas pipes 57 and with air by air pipes 58. As shown in Figure 6 each chamber has a passageway 59 in its side which passageway leads through one of the trunnions 42 to gas pipes or conduits 60 connected with the burners 54 and 55. The gas supply pipe 57, the air supply pipe 58 and the pipes or conduits 60 are each separately controlled by valves 61.

In using the type of furnace illustrated in Figures 5, 6 and 7, my method of reducing metallic oxides is as follows: The chamber 39 is rotated to a horizontal position as shown by the dot-and-dash line 39a. It is then heated by the burner 54 until it reaches a temperature approximating but definitely below that at which the impurities or gangue associated with the metallic oxides are liquefied. The burner 54 is then turned off, the chamber 39 is rotated to a vertical position and the opening at the lower end of the chamber 39 is closed by a cover 51. A mixture of ore and carbonaceous material is then charged into the chamber from a hopper 62. The opening at the upper end of the chamber 39 is then closed and the chamber is rotated about the trunnions 42 so that heat absorbed by the refractory lining 49 of the chamber may be distributed uniformly through the charge of ore and carbonaceous material.

While the ore and carbonaceous material are being heated in the chamber 39 the chamber 40 is being heated by the burner 55. As soon as the heat absorbed by the refractory lining 49 of the chamber 39 has been transferred to the charge, the chamber 39 is stopped in a vertical position and the chamber 40 is turned to a vertical position as shown by the dot-and-dash line 40a. The charge in the chamber 39 is then transferred to the chamber 40 by uncovering the lower opening in the chamber 39 and the lower opening in the chamber 40. The upper opening in the chamber 40 is then closed and the chamber is rotated to facilitate the transfer of heat from the refractory lining 49 of this chamber to the charge of oxide and carbonaceous material. While the charge is being heated in the chamber 40 the chamber 39 is turned to the horizontal position 39a and is again heated by the burner 54 so that it can receive a second charge of ore and carbonaceous material from the hopper 62. At the same time the chamber 41 is being heated by the burner 56.

After the heat retained by the refractory lining 49 in the chamber 40 has been transferred to the charge, the chamber is stopped in the vertical position 40a and the chamber 41 is turned to a vertical position as shown by the dot-and-dash line 41a and the charge in the chamber 40 is transferred to the chamber 41. The upper end opening in the chamber 41 is closed and the chamber 41 is rotated to facilitate transfer of heat from the chamber to the charge.

After the effective heat stored in the chamber 41 has been transferred to the charge the oxide contained in the ore has been substantially reduced to the metal which may be discharged into a receptacle 63 by stopping the chamber 41 in a vertical position and uncovering the lower end opening of the chamber. The receptacle 63 is provided with a cover 64 because the hot metal is readily oxidized by exposure to the atmosphere.

While a charge of ore and carbonaceous material is being heated in the chamber 41 a charge is being heated in the chamber 39 and the chamber 40 is being heated by the burner 55. In this manner a series of charges may be continuously reduced by being transferred from one chamber to the next.

When the mixture of ore and carbonaceous material is being heated and reduced in one of the chambers, combustible gases will be generated by the reduction process. These combustible gases will pass out of the chambers through the passageways 59 and the pipes or conduits 60 to the burners 54 or 55. In this way combustible gases generated during the reduction process in one chamber may be utilized to heat an adjacent chamber.

Thus, by supplying the heat necessary to carry out the reducing reaction from the refractory lining of a heating chamber, rather than by means of a direct flame, I provide a method whereby the reaction can take place in a reducing atmosphere and obtain an efficient and rapid reduction of a metallic oxide.

In actual use of a furnace embodying the principles of my invention I have obtained very satisfactory results. In one demonstration with this furnace I charged into a preheated chamber iron ore and charcoal. The heat was maintained for one and one-quarter hours during which time the furnace was rotated every fifteen minutes. After the charge had cooled it was crushed and passed under a magnetic separator which effected a rough separation. An analysis of the magnetic fraction showed that approximately 95.25% of the iron contained in the magnetic fraction had been reduced to metallic iron.

It is interesting to note that the ore was reduced in the experimental furnace in one and one-quarter hours with a fuel consumption equivalent to .3673 ton of reducing agent per ton of metallic iron produced.

My invention may also be used to concentrate low grade iron ore so that it may be used in the usual iron manufacturing processes. Thus a low grade ore containing $Fe_2O_3$ may be reduced to $Fe_3O_4$ which is the magnetic oxide of iron. The ore can then be passed under a magnetic separator and the magnetic fraction will have sufficient iron concentration to make it suitable for the usual iron manufacturing processes.

While I have described a present preferred embodiment of my invention it is to be understood that my invention is not limited thereto but may be otherwise variously embodied and practiced within the scope of the following claims.

I claim:

1. A process for reducing metallic oxides which includes heating two or more refractory lined chambers, charging a mixture of carbonaceous material and the oxide to be reduced into one of said chambers, primarily heating said mixture by bringing it into contact with the refractory lining of said chamber and transferring to the mixture the heat theretofore adsorbed by said refractory lining, maintaining the mixture at the proper reducing temperature until reduction is completed by transferring the mixture to another of said heated chambers and bringing it into contact with the refractory lining of the second chamber, and continuing the transfer of the mixture from one heated chamber to another until reduction of the oxide is completed.

2. A process for reducing metallic oxides which includes heating two or more refractory lined chambers, charging a mixture of carbonaceous material and the oxide to be reduced into one of said chambers, primarily heating said mixture by bringing it into contact with the refractory lining of said chamber and transferring to the mixture the heat theretofore adsorbed by said refractory lining, maintaining the mixture at the proper reducing temperature until reduction is completed by transferring the mixture to another of said heated chambers and bringing it into contact with the refractory lining of the second chamber, and continuing the transfer of the mixture from one heated chamber to another until reduction of the oxide is completed, the refractory lining of one chamber being heated while the mixture is being heated in a second chamber.

3. A process for reducing metallic oxides which includes heating two or more refractory lined chambers, charging a mixture of carbonaceous material and the oxide to be reduced into one of said chambers, primarily heating said mixture by bringing it into contact with the refractory lining of said chamber and transferring to the mixture the heat theretofore absorbed by said refractory lining, and transferring said mixture to another of said chambers to further heat the mixture by bringing it into contact with the refractory lining of the second chamber and transferring to the mixture the heat theretofore absorbed by said refractory lining.

4. A process for reducing metallic oxide as defined in claim 3 in which gases distilled from the mixture of metallic oxides and carbonaceous material while being heated in one chamber are utilized to heat another chamber.

5. A process for reducing metallic oxides which includes heating a refractory lined chamber, charging a mixture of carbonaceous material and the oxide to be reduced into the chamber, primarily heating said mixture by bringing it into contact with the refractory lining of said chamber and transferring to the mixture the heat theretofore absorbed by said refractory lining, heating a second refractory lined chamber while said mixture is being heated in the first chamber and transferring said mixture to the second chamber to further heat the mixture by bringing it into contact with the refractory lining of the second chamber and transferring to the mixture the heat theretofore absorbed by said refractory lining.

6. A process for reducing metallic oxides which includes heating a series of two or more refractory lined chambers, charging a mixture of carbonaceous material and the oxide to be reduced into the first of said series of chambers, primarily heating said mixture by bringing it into contact with the refractory lining of said chamber and transferring to the mixture the heat theretofore absorbed by said refractory lining and transferring said mixture progressively through said series of refractory lined chambers to further heat the mixture by bringing it into contact with the linings of said chambers and transferring to the mixture the heat theretofore absorbed by said refractory linings.

7. A process for reducing metallic oxides as defined in claim 6 in which gases distilled from the mixture of metallic oxides and carbonaceous material while being heated in one chamber are utilized to heat another chamber.

ARTHUR J. JONES.